(12) United States Patent
Kray

(10) Patent No.: US 12,037,938 B1
(45) Date of Patent: Jul. 16, 2024

(54) COMPOSITE AIRFOIL ASSEMBLY FOR A TURBINE ENGINE

(71) Applicant: GENERAL ELECTRIC COMPANY, Schenectady, NY (US)

(72) Inventor: Nicholas Joseph Kray, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/345,002

(22) Filed: Jun. 30, 2023

(51) Int. Cl.
*F02C 3/04* (2006.01)
*F01D 5/28* (2006.01)

(52) U.S. Cl.
CPC .............. *F02C 3/04* (2013.01); *F01D 5/282* (2013.01)

(58) Field of Classification Search
CPC ...... F02C 7/00; F02C 3/04; F01D 5/28; F01D 5/282; F05D 2300/603
See application file for complete search history.

(56) References Cited

U.S. PATENT DOCUMENTS

| | | | |
|---|---|---|---|
| 7,399,159 B2 | 7/2008 | Matheny et al. | |
| 8,105,042 B2 | 1/2012 | Parkin et al. | |
| 8,221,825 B2 | 7/2012 | Reitz et al. | |
| 8,419,374 B2 | 4/2013 | Huth et al. | |
| 8,573,947 B2 | 11/2013 | Klinetob et al. | |
| 8,696,319 B2 | 4/2014 | Naik | |
| 9,162,750 B2 | 10/2015 | Coupe et al. | |
| 9,416,668 B2 | 8/2016 | Muron et al. | |
| 9,650,897 B2 | 5/2017 | Deal et al. | |
| 9,657,577 B2 | 5/2017 | Weisse | |
| 10,040,538 B2 | 8/2018 | Abe et al. | |
| 10,563,662 B2 | 2/2020 | Acosta et al. | |
| 10,589,475 B2 | 3/2020 | Kray | |
| 11,136,888 B2 | 10/2021 | Husband et al. | |
| 2010/0296942 A1* | 11/2010 | Jevons | F01D 5/282 416/229 R |
| 2011/0052405 A1* | 3/2011 | Parkin | F01D 5/147 264/299 |
| 2013/0156592 A1* | 6/2013 | Kray | F01D 5/282 416/229 A |
| 2014/0030105 A1* | 1/2014 | Fameau | F01D 5/282 416/229 A |
| 2017/0268349 A1* | 9/2017 | Bryant, Jr. | F01D 5/147 |
| 2019/0368361 A1* | 12/2019 | Kray | F01D 5/288 |
| 2020/0157953 A1* | 5/2020 | Jain | F01D 5/288 |
| 2020/0362706 A1* | 11/2020 | Jones | C04B 35/80 |
| 2023/0010778 A1 | 1/2023 | Coutier et al. | |

FOREIGN PATENT DOCUMENTS

GB        758783        10/1956

\* cited by examiner

*Primary Examiner* — William H Rodriguez
(74) *Attorney, Agent, or Firm* — McGarry Bair PC

(57) ABSTRACT

A composite airfoil assembly for a turbine engine. The composite airfoil assembly has an airfoil outer surface defining opposing pressure and suction sides, which extend between a leading edge and a trailing edge. The composite airfoil assembly includes a composite airfoil having a woven core and a skin applied to at least a portion of a core exterior. The composite airfoil assembly also includes a cladding coupled to a skin outer surface where at least one edge or portion of the cladding is located adjacent at least one of the trailing edge, a root, or a tip, wherein the cladding includes a tapered portion.

20 Claims, 8 Drawing Sheets

COMPOSITE AIRFOIL ASSEMBLY FOR A TURBINE ENGINE

TECHNICAL FIELD

The disclosure generally relates to a composite airfoil assembly, more specifically, to a composite airfoil assembly for a turbine engine.

BACKGROUND

A turbine engine typically includes an engine core with a compressor section, a combustor section, and a turbine section in serial flow arrangement. A fan section can be provided upstream of the compressor section. The compressor section compresses air which is channeled to the combustor section where it is mixed with fuel, where the mixture is then ignited for generating hot combustion gases. The combustion gases are channeled to the turbine section which extracts energy from the combustion gases for powering the compressor section, as well as for producing useful work to propel an aircraft in flight or to power a load, such as an electrical generator.

With the advent of composite materials, composites have been used to make components of the gas turbine engine, especially in lower temperature regions, for example, the blades of the fan section. Composite materials typically include a fiber-reinforced matrix and exhibit a high strength to weight ratio. Due to the high strength to weight ratio and moldability to adopt relatively complex shapes, composite materials are utilized in various applications, such as a turbine engine or an aircraft. Composite materials can be, for example, installed on or define a portion of the fuselage and/or wings, rudder, manifold, airfoil, or other components of the aircraft or turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
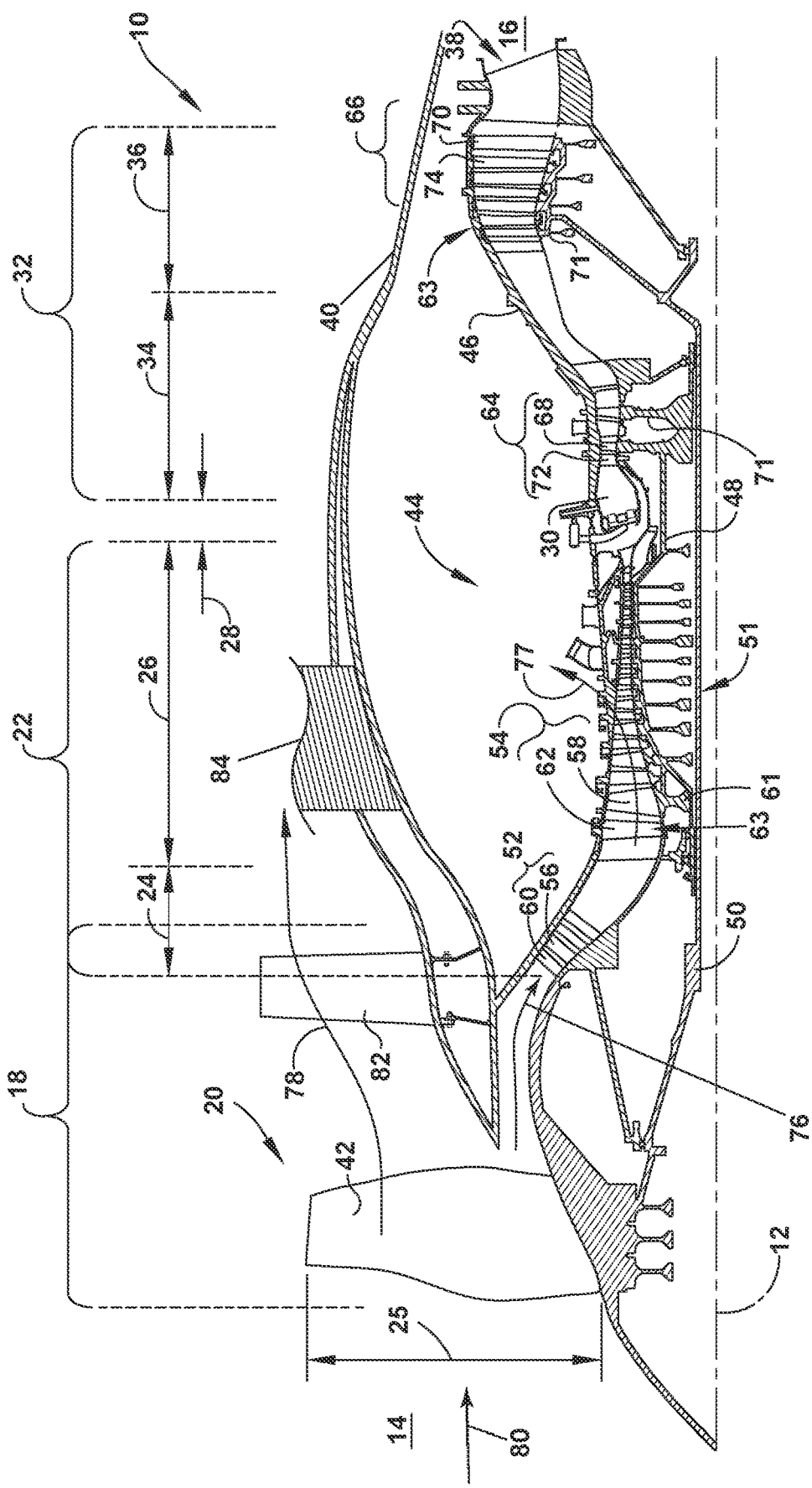
FIG. 1 is a schematic cross-sectional view of an unducted or open rotor turbine engine.

Aspects of the disclosure herein are directed to a composite component to be used to create an engine component for a turbine engine. The composite component is illustrated as a composite airfoil assembly having a composite airfoil that includes at least a core and skin, illustrated as a woven core and laminate skin. The composite airfoil assembly can be located in the fan section of the turbine engine. The laminate skin has a skin outer surface, where a first part of the skin outer surface defines a first portion of an airfoil outer surface of the composite airfoil assembly. A second part of the skin outer surface recesses to receive a cladding.

The cladding received by the recess has a cladding outer surface that defines a second portion of an airfoil outer surface of the composite airfoil assembly. That is, the composite airfoil includes one or more recesses that can receive cladding, such that the outer surface of the cladding and the first portion of the skin outer surface defines the airfoil outer surface of the composite airfoil assembly.

As used herein, the term "cladding" refers to a stiffener or material added to the composite airfoil to increase stiffness and/or strength at a location of the composite airfoil. The cladding can reduce a bending force or moment in an expected direction.

The composite airfoil assembly benefits include a weight savings from the composite airfoil, a strength, stiffness, or strength and stiffness benefit from the cladding, and an aerodynamic benefit from recessing the cladding into the composite airfoil. The smooth airfoil outer surface provides fewer interruptions to airfoil passing over the composite airfoil assembly. That is, the airfoil outer surface does not include a positive bump. Improved aerodynamics results in overall better airflow, which improves engine efficiency.

It should be understood, that the disclosure applies to other engine components of the turbine engine, not just an airfoil, such as a disk or combustor liner, in non-limiting examples. Further, while described in terms of a core used in the manufacture of an airfoil, it will be appreciated that the present disclosure is applied to any other suitable environment.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", "third", or "fourth" may be used interchangeably to distinguish one component from another and are not intended to signify location or importance of the individual components.

The term "at least one of" in the context of, e.g., "at least one of A, B, and C" refers to only A, only B, only C, or any combination of A, B, and C.

The term "turbomachine" or "turbomachinery" refers to a machine including one or more compressors, a heat generating section (e.g., a combustion section), and one or more turbines that together generate a torque output.

The term "turbine engine" refers to an engine having a turbomachine as all or a portion of its power source. Example turbine engines include turbofan engines, turboprop engines, turbojet engines, turboshaft engines, etc., as well as hybrid-electric versions of one or more of these engines.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The terms "fore" or "forward" mean in front of something and "aft" or "rearward" mean behind something. For example, when used in terms of fluid flow, fore/forward can mean upstream and aft/rearward can mean downstream.

The term "fluid" may be a gas, a liquid, or multi-phase.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. For example, in the overall context of a turbine engine, radial refers to a direction along a ray extending between a center longitudinal axis of the engine and an outer engine circumference. In addition, as used herein, the terms "circumferential" and "circumferentially" refer to directions and orientations that extend arcuately about the centerline of the turbine engine.

The terms "coupled," "fixed," "applied to," "attached to" and the like refer to both direct coupling, fixing, or attaching, as well as indirect coupling, fixing, or attaching through one or more intermediate components or features, unless otherwise specified herein.

All directional references (e.g., radial, axial, upper, lower, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

As used herein, the term "stiffness" may be used as defining the extent to which a structure resists deformation in response to force. Stiffness can be defined as the ratio of force to displacement of the object under said force. Stiffness can include resisting deformation in response to force applied from various directionalities, whereby the stiffness can represent an axial stiffness, tensile stiffness, compression stiffness, torsional stiffness, or shear stiffness in non-limiting examples.

The term "composite," as used herein, is indicative of a component having two or more materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC), carbon fibers, polymeric resins, thermoplastics, bismaleimide (BMI) materials, polyimide materials, epoxy resins, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific examples of high-performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic components (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the ceramic matrix. For example, bundles of the fibers may be formed as a reinforced tape, such as a unidirectional reinforced tape. A plurality of the tapes may be laid up together to form a preform component. The bundles of fibers can be impregnated with a slurry composition prior to forming the preform or after formation of the preform. The preform may then undergo thermal processing and subsequent chemical processing, such as melt-infiltration with silicon, to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

The reinforcing fibers can be at least portions of individual filaments or strands. As used herein, a "ceramic fiber tow," a "fiber tow," or simply a "tow" refers to a bundle of a plurality of individual fibers, filaments, or loose strands. The filaments of a tow may be randomly intermingled or arranged in a pattern, and/or may be continuous or non-continuous. For example, a tow may include broken filaments or filament segments. As another example, the filaments of a tow may be substantially parallel, twisted, or otherwise arranged. A tow may act substantially in the same manner as a single or individual filament. It will also be appreciated that an "individual ceramic filament," or simply an "individual filament," as used herein, refers to a singular or non-bundled elongate ceramic member.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many turbine components used in higher temperature sections of turbine engines, such as airfoils (e.g., turbine blades, and vanes), combustors, shrouds and other like components, that would benefit from the lighter-weight and higher temperature capability these materials can offer.

The term "metallic" as used herein is indicative of a material that includes metal such as, but not limited to, titanium, iron, aluminum, stainless steel, brass, copper, and nickel alloys. A metallic material or alloy can be a combination of at least two or more elements or materials, where at least one is a metal. As used herein, the term "additive manufacturing" generally refers to manufacturing processes wherein a feedstock of material in a particulate powder or wire form aggregates to form a three-dimensional component. The feedstock material is then fused through the application of heat or other curing processes to form a monolithic unitary component, which can have a variety of integral sub-components. Monolithic, as used herein, refers to a unitary structure lacking interfaces or joints by virtue of the materials of each layer fusing to or melting with the materials of adjacent layers such that the individual layers lose their identity in the final unitary structure.

Suitable additive manufacturing techniques in accordance with the present disclosure include, for example, directed energy deposition (DED), fused deposition modeling (FDM), selective laser sintering (SLS), 3D printing such as by inkjets and laserjets, sterolithography (SLA), direct selective laser sintering (DSLS), electron beam sintering (EBS), electron beam melting (EBM), laser engineered net shaping (LENS), laser net shape manufacturing (LNSM), direct metal deposition (DMD), digital light processing (DLP), direct selective laser melting (DSLM), selective laser melting (SLM), direct metal laser melting (DMLM), and other known processes.

Digital light processing (DLP) can include a 3D DLP printer having a transparent vat or transparent tank, a building platform, and a light assembly. The transparent vat or transparent tank can contain, for example, a photopolymer resin.

The DLP building platform can couple to, for example, a motor or other mechanisms permitting the movement of the building platform in one or more dimensions, such as raising or lowering the building platform from or toward the resin in the vat or tank.

A DLP printed component can couple to a lower portion of the building platform facing the vat or tank. The lighting assembly is located, at least in part, below the vat or tank. The lighting assembly can include at least one light source and at least one optical reflector or refractor such as, for example, a deflection mirror or at least one lens.

A controller coupled to or included in the DLP printer can control one or more aspects of the DLP printer such as, for example, the position of the DLP building platform or the intensity, duration, or orientation of the lighting source.

In addition to using a direct metal laser sintering (DMLS), a direct metal laser melting (DMLM) process, or an electron beam melting (EBM) process, where an energy source is used to selectively sinter or melt portions of a layer of powder, it should be appreciated that according to alternative aspects of the present disclosure, the additive manufacturing process can be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent can be, for example, a photo-curable polymer or another liquid bonding agent. Other suitable additive manufacturing methods and variants are intended to be within the scope of the present subject matter.

FIG. 1 is a schematic cross-sectional diagram of a turbine engine, specifically an open rotor or unducted turbine engine 10 for an aircraft. The unducted turbine engine 10 has a generally longitudinally extending axis or engine centerline 12 extending from a forward end 14 to an aft end 16. The unducted turbine engine 10 includes, in downstream serial flow relationship, a set of circumferentially spaced blades or propellers defining a fan section 18 including a fan 20, a compressor section 22 including a booster or low pressure (LP) compressor 24 and a high pressure (HP) compressor 26, a combustion section 28 including a combustor 30, a turbine section 32 including an HP turbine 34, and an LP turbine 36, and an exhaust section 38. The unducted turbine engine 10 as described herein is meant as a non-limiting example, and other architectures are possible, such as, but not limited to, a steam turbine engine, a supercritical carbon dioxide turbine engine, or any other suitable turbine engine.

An exterior surface, defined by a housing, such as a nacelle 40, of the unducted turbine engine 10 extends from the forward end 14 of the unducted turbine engine 10 toward the aft end 16 of the unducted turbine engine 10 and covers at least a portion of the compressor section 22, the combustion section 28, the turbine section 32, and the exhaust section 38. The fan section 18 can be positioned at a forward portion of the nacelle 40 and extend radially outward from the nacelle 40 of the unducted turbine engine 10, specifically, the fan section 18 extends radially outward from the nacelle 40. The fan section 18 includes a set of fan blades 42, and a set of stationary fan vanes 82 downstream the set of fan blades 42, both disposed radially about the engine centerline 12. The unducted turbine engine 10 includes any number of one or more sets of rotating blades or propellers (e.g., the set of fan blades 42) disposed upstream of the set of stationary fan vanes 82. As a non-limiting example, the unducted turbine engine 10 can include multiple sets of fan blades 42 or the set of stationary fan vanes 82. As such, the unducted turbine engine 10 is further defined as an unducted single-fan turbine engine. The unducted turbine engine 10 is further defined by the location of the fan section 18 with respect to the combustion section 28. The fan section 18 can be upstream, downstream, or in-line with the axial positioning of the combustion section 28.

The compressor section 22, the combustion section 28, and the turbine section 32 are collectively referred to as an engine core 44, which generates combustion gases. The engine core 44 is surrounded by an engine casing 46, which is operatively coupled with a portion of the nacelle 40 of the unducted turbine engine 10.

An HP shaft or spool 48 disposed coaxially about the engine centerline 12 of the unducted turbine engine 10 drivingly connects the HP turbine 34 to the HP compressor 26. An LP shaft or spool 50, which is disposed coaxially about the engine centerline 12 of the unducted turbine engine 10 within the larger diameter annular HP spool 48, drivingly connects the LP turbine 36 to the LP compressor 24 and fan 20. The spools 48, 50 are rotatable about the engine centerline 12 and couple to a set of rotatable elements, which collectively define a rotor 51.

It will be appreciated that the unducted turbine engine 10 is either a direct drive or integral drive engine utilizing a reduction gearbox coupling the LP shaft or spool 50 to the fan 20.

The LP compressor 24 and the HP compressor 26, respectively, include a set of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 are provided in a ring and extend radially outwardly relative to the engine centerline 12, from a blade platform to a blade tip, while the corresponding static compressor vanes 60, 62 are positioned upstream of and adjacent to the compressor blades 56, 58. It is noted that the number of blades, vanes, and compressor stages shown in FIG. 1 were selected for illustrative purposes only, and that other numbers are possible.

The compressor blades 56, 58 for a stage of the compressor are mounted to a disk 61, which is mounted to the corresponding one of the HP and LP spools 48, 50, with each stage having its own disk 61. The static compressor vanes 60, 62 for a stage of the compressor are mounted to the engine casing 46 in a circumferential arrangement.

The HP turbine 34 and the LP turbine 36, respectively, include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 are provided in a ring and extends radially outwardly relative to the engine centerline 12, from a blade platform to a blade tip, while the corresponding static turbine vanes 72, 74 are positioned upstream of and adjacent to the turbine blades 68, 70. It is noted that the number of blades, vanes, and turbine stages shown in FIG. 1 were selected for illustrative purposes only, and that other numbers are possible.

The turbine blades 68, 70 for a stage of the turbine section 32 are mounted to a disk 71, which is mounted to the corresponding one of the HP and LP spools 48, 50, with each stage having a dedicated disk 71. The static turbine vanes 72, 74 for a stage of the turbine section 32 are be mounted to the engine casing 46 in a circumferential arrangement.

Rotary portions of the unducted turbine engine 10, such as the blades 56, 58 68, 70 among the compressor section 22 and the turbine section 32 are also referred to individually or collectively as the rotor 51. As such, the rotor refers to the combination of rotating elements throughout the unducted turbine engine 10.

Complementary to the rotor portion, the stationary portions of the unducted turbine engine 10, such as the static vanes 60, 62, 72, 74 among the compressor section 22 and the turbine section 32 are also referred to individually or collectively as a stator 63. As such, the stator 63 refers to the combination of non-rotating elements throughout the unducted turbine engine 10.

The nacelle 40 is operatively coupled to the unducted turbine engine 10 and covers at least a portion of the engine core 44, the engine casing 46, or the exhaust section 38. At least a portion of the nacelle 40 extends axially forward or upstream the illustrated position. For example, the nacelle 40 extends axially forward such that a portion of the nacelle 40 overlays or covers a portion of the fan section 18 or a booster section (not illustrated) of the unducted turbine engine 10.

During operation of the unducted turbine engine 10, a freestream airflow 80 flows against a forward portion of the unducted turbine engine 10. A portion of the freestream airflow 80 enters an annular area 25 defined by the swept area between the outer surface of the nacelle 40 and the tip of the blade, with this air flow being an inlet airflow 78. A portion of the inlet airflow 78 enters the engine core 44 and is described as a working airflow 76, which is used for combustion within the engine core 44.

More specifically, the working airflow 76 flows into the LP compressor 24, which then pressurizes the working airflow 76 thus defining a pressurized airflow that is supplied to the HP compressor 26, which further pressurizes the air. The working airflow 76, or the pressurized airflow, from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the working airflow 76, or exhaust gas, is ultimately discharged from the unducted turbine engine 10 via the exhaust section 38. The driving of the LP turbine 36 drives the LP spool 50 to rotate the fan 20 and the LP compressor 24. The working airflow 76, including the pressurized airflow and the combustion gases, defines a working airflow that flows through the compressor section 22, the combustion section 28, and the turbine section 32 of the unducted turbine engine 10.

The inlet airflow 78 flows through the set of fan blades 42 and over the nacelle 40 of the unducted turbine engine 10. Subsequently, the inlet airflow 78 flows over at least a portion of the set of stationary fan vanes 82, which directs the inlet airflow 78 such that it is transverse toward the engine centerline 12. The inlet airflow 78 then flows past the set of stationary fan vanes 82, following the curvature of the nacelle 40 and toward the exhaust section 38. A pylon 84 mounts the unducted turbine engine 10 to an exterior structure (e.g., a fuselage of an aircraft, a wing, a tail wing, etc.).

The working airflow 76 and at least some of the inlet airflow 78 merge downstream of the exhaust section 38 of the unducted turbine engine 10. The working airflow 76 and the inlet airflow 78, together, form an overall thrust of the unducted turbine engine 10.

It is contemplated that a portion of the working airflow 76 is drawn as bleed air 77 (e.g., from the compressor section 22). The bleed air 77 provides an airflow to engine components requiring cooling. The temperature of the working airflow 76 exiting the combustor 30 is significantly increased with respect to the working airflow 76 within the compressor section 22. As such, cooling provided by the bleed air 77 is necessary for operating of such engine components in the heightened temperature environments or a hot portion of the unducted turbine engine 10. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid are, but are not limited to, fluid discharged from the LP compressor 24 or the HP compressor 26.

Figure 2:
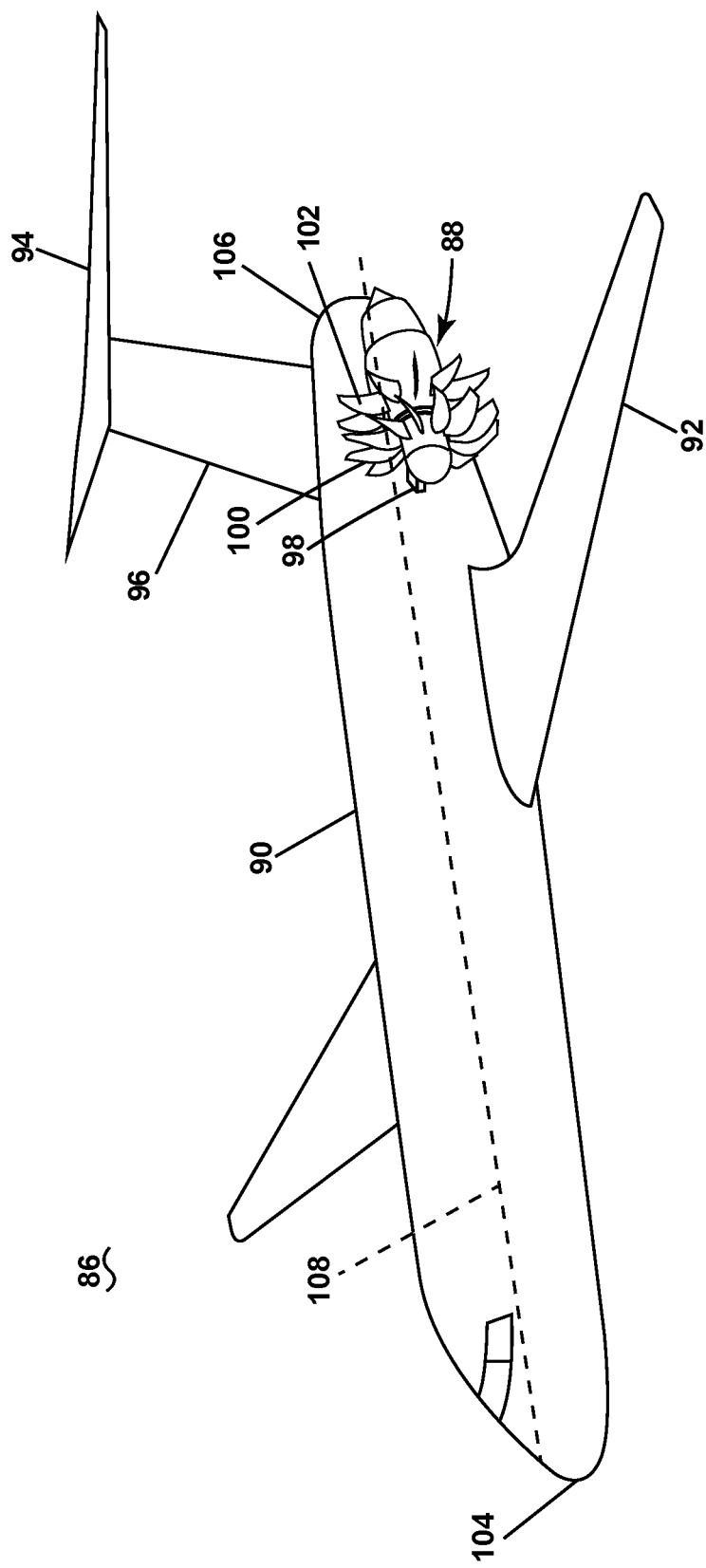
FIG. 2 is a schematic perspective view of an aircraft including the unducted or open rotor turbine engine of FIG. 1.

FIG. 2 is a schematic perspective view of an aircraft 86 including a generic unducted turbine engine 88 suitable for use as the unducted turbine engine 10 of FIG. 1. The aircraft 86 includes a fuselage 90 with an exterior surface. At least one wing 92 and a tail wing 94 extend from the fuselage 90. The tail wing 94 is operably coupled to and spaced from the fuselage 90 via a tail wing pylon 96. The unducted turbine engine 88 is operably coupled to the exterior surface of the fuselage 90 via a pylon 98. The unducted turbine engine 88 includes a set of circumferentially spaced fan blades 100. A set of stationary fan vanes 102 is provided downstream of the set of circumferentially spaced fan blades 100. The fuselage 90 extends between a nose 104 and a tail 106 and includes a fuselage centerline 108 extending therebetween.

Additionally, while the tail wing 94 is a T-wing tail wing (e.g., the tail wing 94 as illustrated), other conventional tail wings are contemplated such as, a cruciform tail wing, an H-tail, a triple tail, a V-tail, an inverted tail, a Y-tail, a twin-tail, a boom-mounted tail, or a ring tail, all of which are referred to herein as the tail wing 94.

Figure 3:
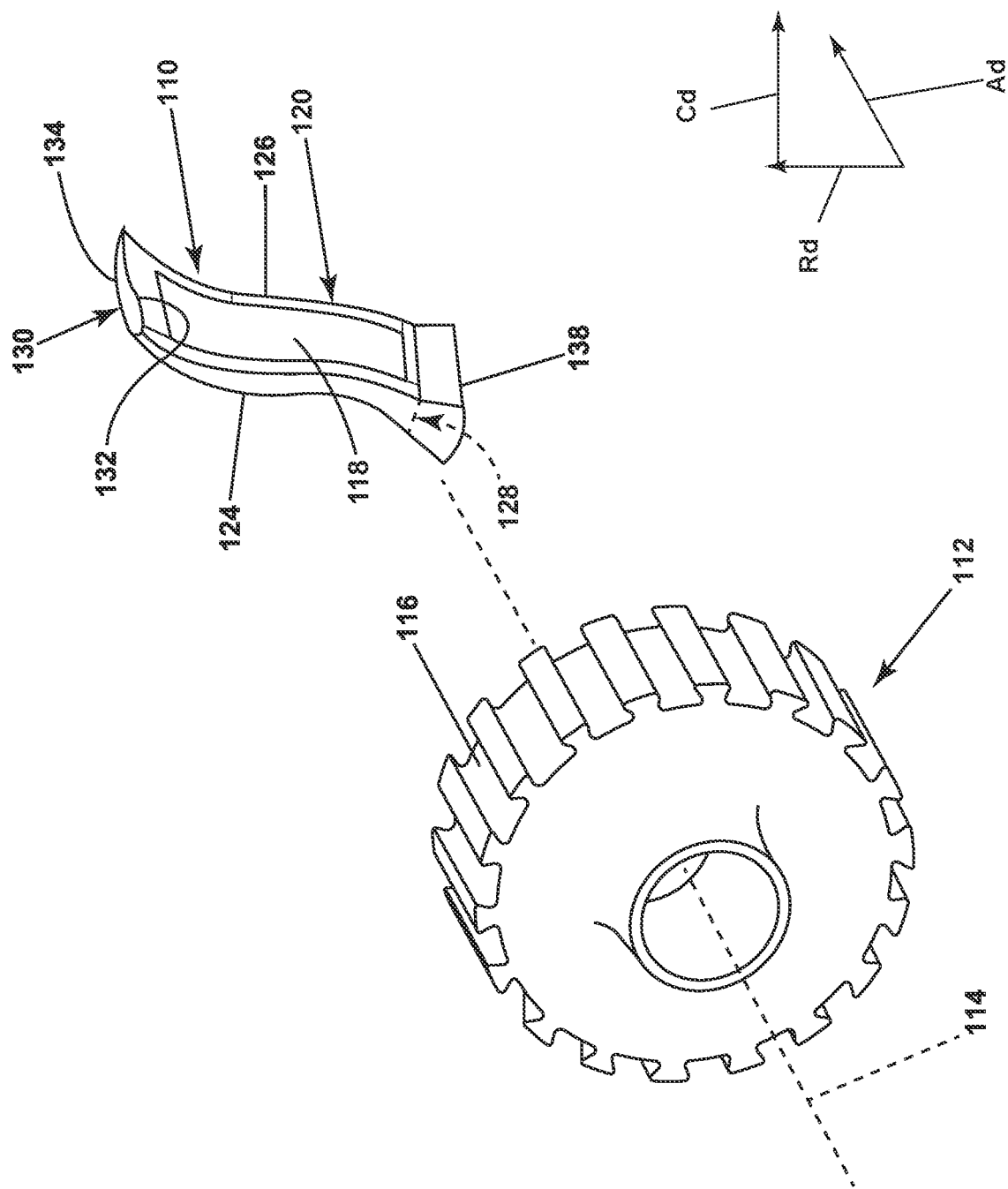
FIG. 3 is a schematic perspective view of a composite airfoil assembly and a disk assembly suitable for use within the turbine engine of FIG. 1 and FIG. 2, the composite blade assembly including a composite airfoil, cladding, and a dovetail, in accordance with an exemplary embodiment of the present disclosure.

FIG. 3 is a schematic perspective view of a composite airfoil assembly 110 and a disk assembly 112 suitable for use within the unducted turbine engine 10 of FIG. 1 or the unducted turbine engine 88 of FIG. 2. The disk assembly 112 is suitable for use as the disk 61, 71 (FIG. 1) or any other disk such as, but not limited to, a disk within the fan section 18, the compressor section 22, or the turbine section 32 of the unducted turbine engine 10. The composite airfoil assembly 110 can be rotating or non-rotating such that the composite airfoil assembly 110 can include at least one of the static compressor vanes 60, 62 (FIG. 1), the set of compressor blades 56, 58 (FIG. 1), the static turbine vanes 72, 74 (FIG. 1), the set of turbine blades 68, 70 (FIG. 1), or the set of fan blades 42 (FIG. 1). As a non-limiting example, the composite airfoil assembly 110 can be a composite fan blade assembly.

The disk assembly 112 can be rotatable or stationary about a rotational axis 114. The rotational axis 114 can coincide with or be offset from the engine centerline (e.g., the engine centerline 12 of FIG. 1). The disk assembly 112 includes a plurality of slots 116 extending axially through a radially outer portion of the disk assembly 112 and being circumferentially spaced about the disk assembly 112, with respect to the rotational axis 114.

The composite airfoil assembly 110 includes a composite airfoil 118 and a cladding 120. The composite airfoil 118 extends between a leading edge 124 and a trailing edge 126, opposite the leading edge 124, to define a chord-wise direction. The composite airfoil 118 extends between a root 128 and a tip 130 to define a span-wise direction. The composite airfoil 118 includes a pressure side 132 and a suction side 134, opposite the pressure side 132.

The leading edge 124 and the trailing edge 126, extend radially from the root 128 to the tip 130. The pressure side 132 and the suction side 134, opposite the pressure side 132, extend axially between the leading edge 124 and the trailing edge 126. A dovetail portion 138 can extend from the composite airfoil 118.

The composite airfoil assembly 110 is coupled to the disk assembly 112 by inserting at least a portion of the dovetail portion 138 into a respective slot of the plurality of slots 116. The composite airfoil assembly 110 is held in place by frictional contact with the slot 116 or can be coupled to the slot 116 via any suitable coupling method such as, but not limited to, welding, adhesion, fastening, or the like. While only a single composite airfoil assembly 110 is illustrated, it will be appreciated that there can be any number of composite airfoils assemblies 110 coupled to the disk assembly 112. As a non-limiting example, there can be a plurality of composite airfoil assemblies 110 corresponding to a total number of slots of the plurality of slots 116.

For the sake of reference, a set of relative reference directions, along with a coordinate system can be applied to the composite airfoil assembly 110. An axial direction (Ad), can extend from forward to aft and is shown extending at least partially into the page. The axial direction (Ad) and can be arranged parallel to the rotational axis 114. A radial direction (Rd) extends perpendicular to the axial direction (Ad), and can extend perpendicular to the engine centerline 12. A circumferential direction (Cd) can be defined perpendicular to the radial direction (Rd), and can be defined along the circumference of the unducted turbine engine 10 (FIG. 1) relative to the engine centerline 12 (FIG. 1).

Figure 4:
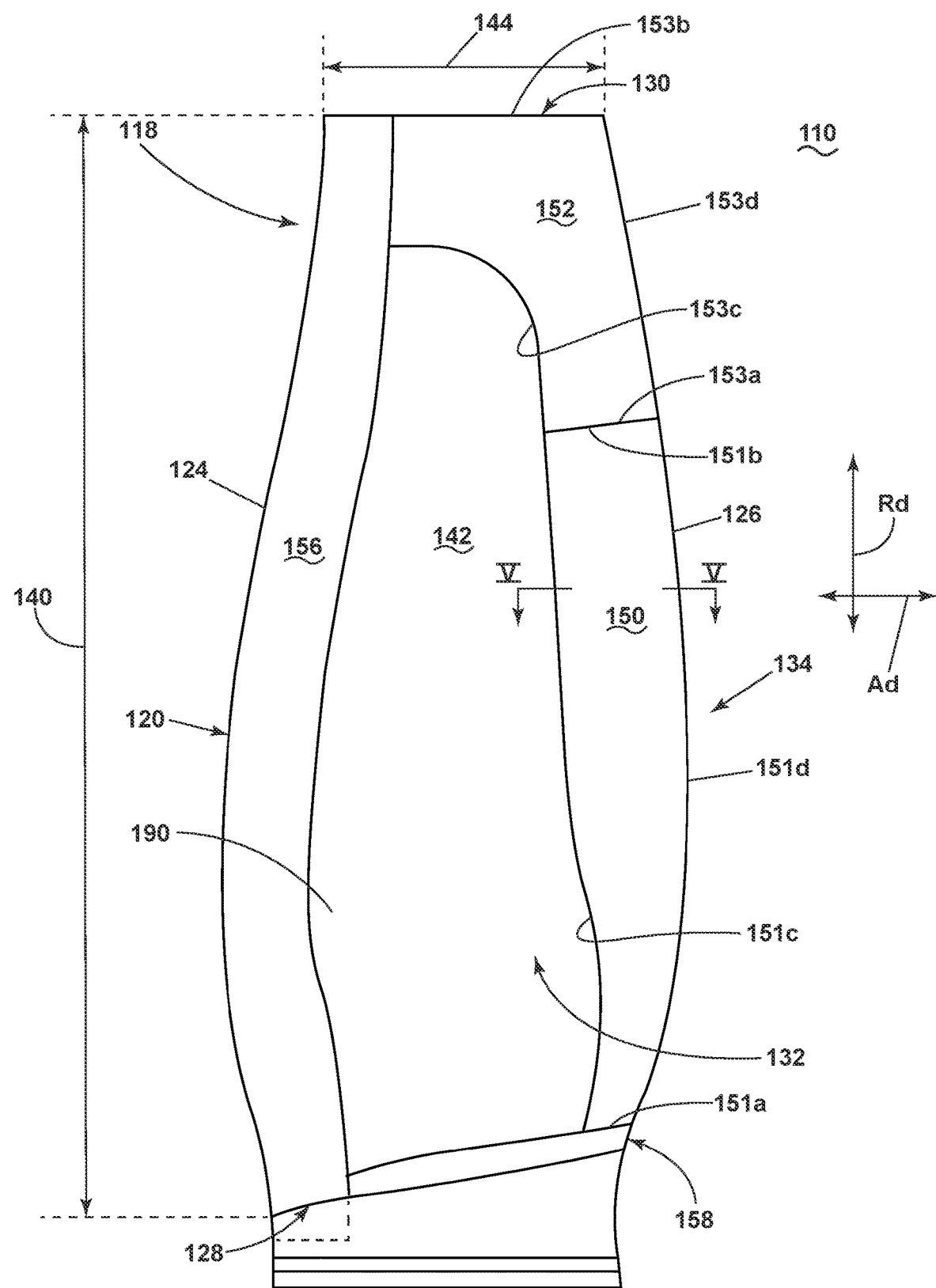
FIG. 4 is an enlarged view of the composite airfoil assembly of FIG. 3, in accordance with an exemplary embodiment of the present disclosure.

FIG. 4 is an enlarged view of the composite airfoil assembly 110 further illustrating the cladding 120. An airfoil length 140 can be measured from the root 128 to the tip 130 of the composite airfoil 118. While illustrated as variable, the airfoil length 140 can be an average length, weighted average, minimum length, or maximum length measured from the root 128 to the tip 130 of the composite airfoil 118 in the radial direction (Rd) or spanwise direction defined from the root 128 to the tip 130.

An airfoil outer surface 142 of the composite airfoil assembly 110 is defined by the pressure side 132 and the suction side 134, opposite the pressure side 132. The pressure side 132 and the suction side 134 extend radially in the span-wise direction from the root 128 to the tip 130. The suction side 134 can mirror the pressure side 132 and have the same surface area. However, it is contemplated that the surface area of the suction side can be less than or greater than the surface area of the pressure side 132.

An axial airfoil length 144 can be measured between the leading edge 124 and the trailing edge 126 of the composite airfoil 118. While illustrated as variable, the axial airfoil length 144 can be an average length, weighted average, minimum length, or maximum length measured from the leading edge 124 and the trailing edge 126 of the composite airfoil 118 in the axial direction (Ad), a chordwise direction, or measured along a mean camber line that is equidistant from the pressure side 132 and the suction side 134 from the leading edge 124 and the trailing edge 126.

Figure 6:
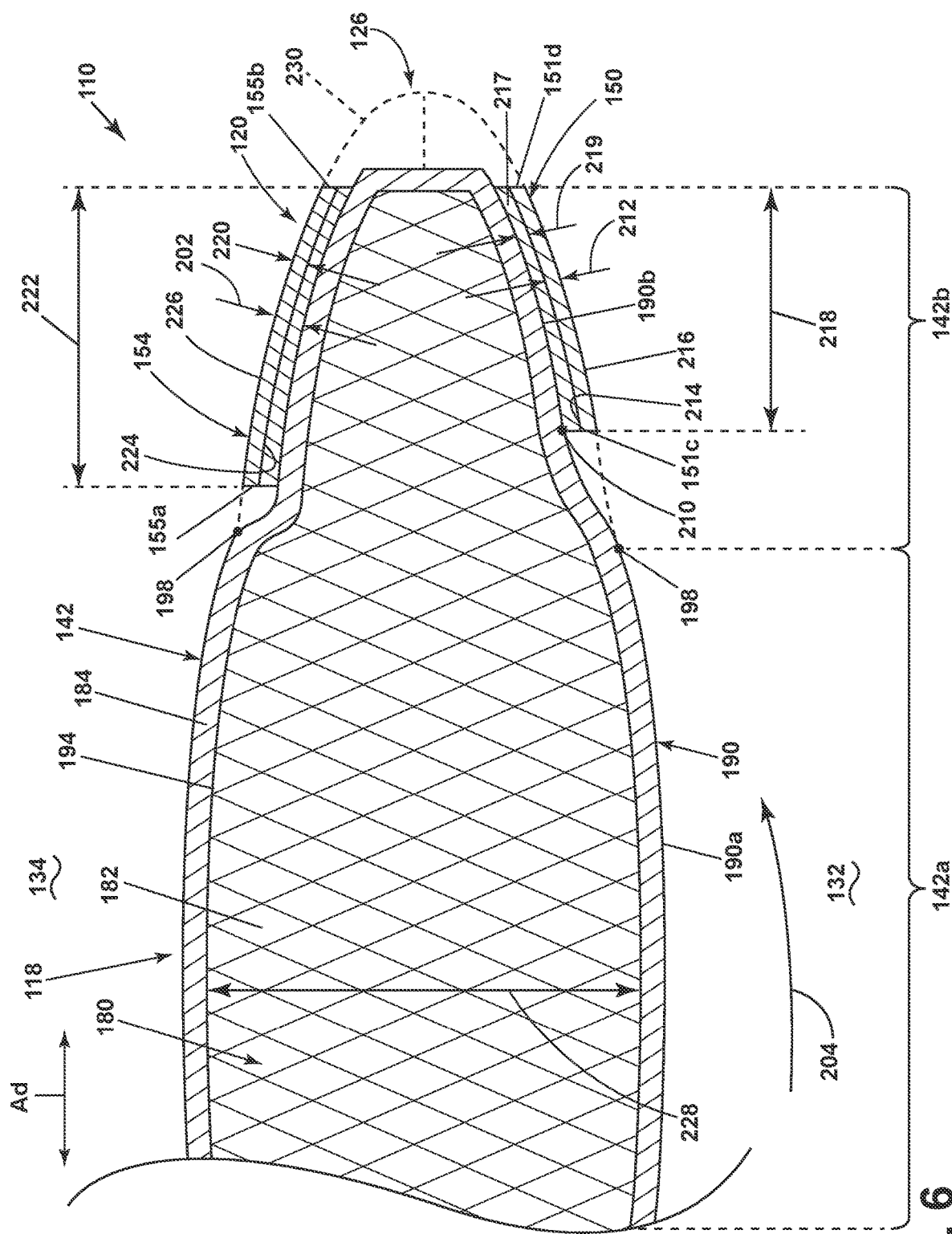
FIG. 6 is a schematic cross-sectional of the interior of the composite airfoil of FIG. 5 with cladding, in accordance with an exemplary embodiment of the present disclosure.

The cladding 120 includes two or more cladding elements (or claddings). The cladding 120 refers to the combination of all cladding elements on the composite airfoil assembly 110. As illustrated in FIG. 4 and FIG. 6, for example, the cladding 120 includes a first cladding 150 and a third cladding 154 at or adjacent the trailing edge 126, a leading-edge sheath 156 located at the leading edge 124, a second cladding 152 at or adjacent the tip 130, and a root cladding assembly 158 at the root 128.

The cladding 120 couples to or is applied to the composite airfoil 118 at the outer surface 142 of the composite airfoil 118, illustrated as a skin outer surface 190.

The first cladding 150 has a first perimeter defined by edges. As illustrated, by way of example, the perimeter of the first cladding 150 can include a root edge 151*a* located closest to the root 128, a tip edge 151*b* located closest to the tip 130, an axially forward edge 151*c* located at the pressure side 132 between the leading edge 124 and the trailing edge 126, and an axially aft edge 151*d* adjacent or at the trailing edge 126.

The second cladding 152 has a second perimeter, illustrated by way of example as a root edge 153*a* located closest to the root 128, a tip edge 153*b* located at the tip 130, an axially forward edge 153*c* located at the pressure side 132 between the leading edge 124 and the trailing edge 126, and an axially aft edge 153*d* adjacent or at the trailing edge 126.

The cladding 120 can further include a third cladding 154 (FIG. 6). The third cladding 154 (FIG. 6) has a similar geometry to the first cladding 150, but located on the suction side 134 at the trailing edge 126. As used herein, when an object has a "similar geometry" to a second object, the surface area of the second object is within 10% of the surface area of the first object. That is, the cladding 120 on the suction side 134 can mirror portions of the cladding on the pressure side 132. However, it is contemplated in a different and non-limiting example, that the cladding 120 on the suction side 134 can differ in size and location when compared to the cladding 120 on the pressure side 132.

Alternatively, in a different and non-limiting example, the first cladding 150 can be unitarily formed over at least a portion of the trailing edge 126. That is, the first cladding 150 can have parts on both the suction side 134 and the pressure side 132, such that a portion of the first cladding 150 covers a portion of the trailing edge 126. In other words, the first cladding 150 can wrap around the trailing edge 126 of the composite airfoil 118 where a portion of the first cladding 150 is on the pressure side 132 and another portion extends to the suction side 134. In this non-limiting example where the first cladding 150 wraps around the trailing edge 126, the first cladding 150 can have a V-shaped or U-shaped cross-section.

The cladding 120 can further include a fourth cladding (not shown). The fourth cladding can be located on the suction side 134 at the tip 130 opposite of the second cladding 152. While it is contemplated that the fourth cladding can have a surface area that has a similar geometry as the second cladding 152, it is also contemplated that the surface area of the fourth cladding is smaller than or greater than the surface area of the second cladding 152 by more than 10%.

Alternatively, in a different and non-limiting example, the second cladding 152 can be unitarily formed over at least a portion of the tip 130. That is, the second cladding 152 can have parts on both the suction side 134 and the pressure side 132, such that a portion of the second cladding 152 covers a portion of the tip 130.

In other words, the second cladding 152 can wrap around the tip 130 of the composite airfoil 118 where a portion of the second cladding 152 is on the pressure side 132 and another portion extends to the suction side 134.

Optionally, the cladding 120 can further include a root cladding assembly 158 at the root 128 of the composite airfoil 118. The root cladding assembly 158 can include any number of claddings in partial contact with the root on the pressure side 132, the suction side 134, or the trailing edge 126.

By way of non-limiting example, adhesives 217 (FIG. 6) can be used to couple one or more portions of the cladding 120 to the skin outer surface 190 of the composite airfoil 118. Examples of adhesives can include, but are not limited to, epoxy, phenolic, adhesive film, adhesive tape, cyanoacrylate, anaerobic adhesive, thermoplastic adhesive, polymeric resin, or other thermoset adhesive.

Additionally, or alternatively, mechanical fasteners can be used to couple one or more portions of the cladding 120 to the skin outer surface 190 of the composite airfoil 118.

Alternatively, in a different non-limiting example, one or more portions of the cladding 120 can be applied using additive manufacturing to the skin outer surface 190 of the composite airfoil 118. That is, the first cladding 150, the second cladding 152, the third cladding 154 (FIG. 6), the fourth cladding, the leading-edge sheath 156, or the root cladding assembly 158 can be one or more layers additively manufactured onto the skin outer surface 190 of the composite airfoil 118.

A total surface area of the composite airfoil 118 is defined as a sum of the surface area of the pressure side 132 and the surface area of the suction side 134. The cladding 120 can overlap or cover 0.6% to 70% of the total surface area of the composite airfoil 118. More specifically, the cladding 120 can cover a range from 2% to 60% of the total surface area of the composite airfoil 118. The cladding 120 provides strength or stiffness to the composite airfoil 118 and the range of the total surface area covered by the cladding 120 improves strength or stiffness while maintaining a weight benefit provided by the composite airfoil 118.

It is contemplated that the first cladding 150, the second cladding 152, and the third cladding 154 (FIG. 6) can cover a range from 2% to 60% of a pressure side surface area, a suction side surface area, or a total surface area defined by a sum of the pressure side surface area and the suction side surface area. The range of the total surface area covered by the first cladding 150, the second cladding 152, and the third cladding 154 (FIG. 6) improves strength or stiffness while maintaining a weight benefit provided by the composite airfoil 118.

The first cladding 150 is illustrated, by way of example, as located adjacent the trailing edge 126 of the composite airfoil 118 when mounted, bonded, or otherwise coupled to the skin outer surface 190 of the composite airfoil 118. As used herein, "adjacent the trailing edge 126" means that the greatest distance measured from the trailing edge 126 to any portion of the adjacent object is less than 10% of the airfoil length 140. Further, the first cladding 150 is illustrated, by way of example, as located at the trailing edge 126 of the composite airfoil 118. That is, at least a portion of the first cladding 150 is in contact with the trailing edge 126 when the first cladding 150 is mounted, bonded, or otherwise coupled to the composite airfoil 118.

The second cladding 152 is illustrated, by way of example, as located adjacent the tip 130 of the composite airfoil 118 when mounted, bonded, or otherwise coupled to the skin outer surface 190 of the composite airfoil 118. As used herein, "adjacent the tip 130" means that the greatest distance measured from the tip 130 to any portion of the adjacent object is less than 10% of the airfoil length 140. Further, the second cladding 152 is illustrated, by way of example, as located at the tip 130 of the composite airfoil 118. That is, at least a portion of the second cladding 152 is in contact with the tip 130 when the second cladding 152 is mounted, bonded, or otherwise coupled to the composite airfoil 118.

While illustrated as an irregular quadrilateral and an irregular pentagon, portions of the cladding 120, such as the first cladding 150 or the second cladding 152 can have a shape that is any combination of one or more regular polygons, irregular polygons, or circles having any number of linear or curved portions.

The cladding 120 can include any number of claddings or cladding assemblies on any one or more of the suction side 134, the pressure side 132, the trailing edge 126, the leading edge 124, the root 128, or the tip 130. That is, the cladding 120 can include any material applied to the composite airfoil 118 adjacent the trailing edge 126, the leading edge 124, the root 128, or the tip 130. The term "adjacent the leading edge 124" means that the greatest distance measured from the leading edge 124 to any portion of the adjacent object is less than 10% of the airfoil length 140. Further, the term "adjacent the root 128" means that the greatest distance measured from the root 128 to any portion of the adjacent object is less than 10% of the airfoil length 140. Locating the cladding 120 adjacent (less than 10% from) the trailing edge 126, the leading edge 124, the root 128, or the tip 130 provides the benefit of improved resistance to torsion. The cladding 120 location can also provide the benefit of increased strength or resistance forces caused by impact or rotation while maintaining a weight benefit.

Figure 5:
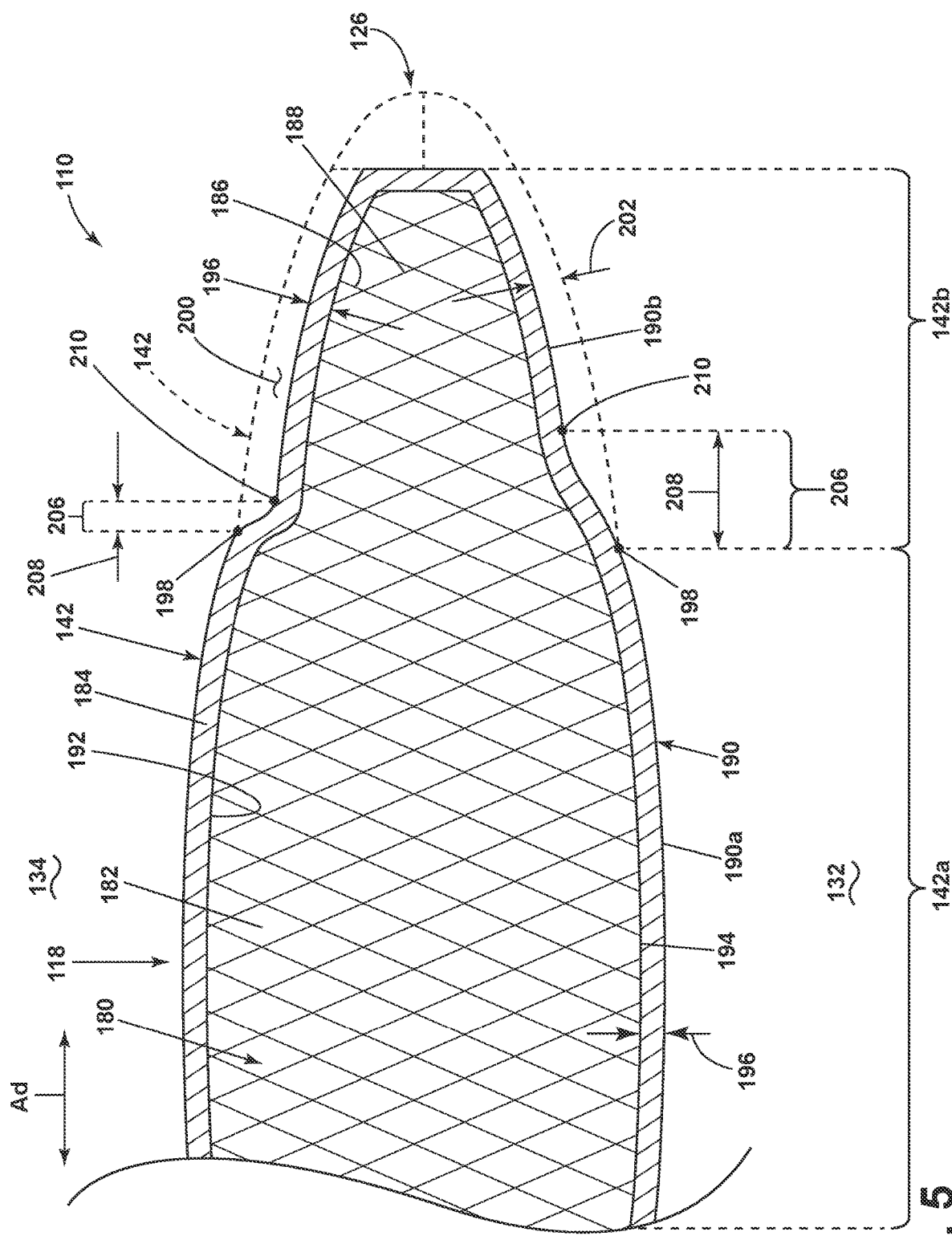
FIG. 5 is a schematic cross-sectional view taken along line V-V of FIG. 4 showing an interior of the composite airfoil with cladding removed, in accordance with an exemplary embodiment of the present disclosure.

FIG. 5 shows a schematic cross-sectional view of a trailing edge portion of the composite airfoil assembly 110 of FIG. 4, taken along line V-V of FIG. 4, illustrating a portion of an interior 180 of the composite airfoil assembly 110. The cladding 120 (FIG. 3) is removed for ease of understanding.

The composite airfoil 118 includes a core illustrated as a woven core 182 and a skin illustrated as a laminate skin 184 provided over the woven core 182. The woven core 182 includes a composite structure having a core bulk modulus. The core bulk modulus is less than a first bulk modulus of the first cladding 150 (FIG. 4) and a second bulk modulus of the second cladding 152 (FIG. 4).

The woven core 182 can be dry, with no additional materials, or alternatively, impregnated with a resin and cured in one non-limiting example. The woven core 182 can be made of a woven structure. Such a woven structure can be a three-dimensional woven structure. More specifically, the woven structure can be woven in a combination of the axial direction (Ad), the radial direction (Rd), and the circumferential direction (Cd) (FIG. 3), while it should be appreciated that a weave pattern can be formed and defined separate from the unducted turbine engine 10 (FIG. 1), such that the weave pattern is woven in any three, mutually-orthogonal planes in order to define a three-dimensional object relative to said planes. In one non-limiting example, the woven structure can include a three-dimensional weaving including a plurality of warp fibers 186 and a plurality of weft fibers 188 which can be woven in three directions to form a three-dimensional structure for the woven core 182. The three directions for the warp fibers 186 and weft fibers 188 can be defined along or angled relative to the axial direction (Ad), the radial direction (Rd), and the circumferential direction (Cd) (FIG. 3). In one non-limiting example, a Jacquard loom, or 3D weaving machine can be used to create complex three-dimensional woven structures, which can include interweaving one or more composites to form the woven core 182. The woven core 182 can be comprised of composite materials, such as carbon or carbon fibers, glass or glass fibers, nylon, rayon, or other aramid fibers, while other materials such as nickel, titanium, or ceramic composites are contemplated in non-limiting examples.

It is further contemplated that the woven core 182 can be formed as a three-dimensional woven structure, having a braided or a plaited geometry or pattern. A braided or a plaited geometry or pattern can include a weave pattern that includes three or more interlaced fibers that are woven in a repeating pattern, for example. In another non-limiting example, the braided geometry can include a set of fibers or strands that are sequentially laid over one another to define the braided geometry. The woven or braided geometry or pattern can repeat for the entirety of the woven core 182, or only a portion thereof. Such additional braided geometries can be similar, where the arrangement of the fibers is the same, but the orientation is different, or where the arrangement of the fibers is different, and the orientation can be similar or dissimilar. The braided geometry or pattern can be formed with a Jacquard loom or 3D weaving machine with composite materials. A three-dimensional braided structure can include a braided pattern that extends in three dimensions, such as a combination of the axial direction (Ad), the radial direction (Rd), and the circumferential direction (Cd) (FIG. 3).

The laminate skin 184 can be formed as a set of laminate layers, provided around or about the woven core 182. The laminate skin 184 can be pre-impregnated, fiber placed, or dry fiber laminate layers, in non-limiting examples. Such laminate layers forming the laminate skin 184 can be formed by resin transfer molding (RTM), partial RTM, same qualified resin transfer molding (SQRTM), or out-of-autoclave in non-limiting examples. The woven core 182 can be made from a different material than the laminate skin 184.

The laminate skin 184 can include a skin bulk modulus. The skin bulk modulus can be different than the core bulk modulus. In one example, the skin bulk modulus can be greater than the core bulk modulus.

The laminate skin 184 can include a skin outer surface 190 and a skin inner surface 192. The skin inner surface 192 can, at least in part, be in contact with at least a portion of an exterior 194 of the woven core 182. In other words, the laminate skin 184 can be applied to at least a portion of the exterior 194 of the woven core 182.

A skin thickness 196 can be measured from the skin outer surface 190 to the skin inner surface 192. While illustrated as uniform, the skin thickness 196 can vary in the axial direction (Ad), the radial direction (Rd) (FIG. 3) or the circumferential direction (Cd) (FIG. 3).

A first portion 190a of the skin outer surface 190 defines a first portion 142a of the airfoil outer surface 142 of the composite airfoil assembly 110. A second portion 190b of the skin outer surface 190 lies below a second portion 142b of the airfoil outer surface 142.

An intersection 198 is defined at the location where the first portion 190a of the skin outer surface 190 changes, deflects, or otherwise intersects the second portion 190b of the skin outer surface 190. As illustrated by way of example, the first portion 190a of the skin outer surface 190 and the second portion 190b of the skin outer surface 190 can be different portions of the same skin outer surface 190. That is, the intersection 198 separates the first portion 190a and the second portion 190b of the skin outer surface 190. Alternatively, in a different and non-limiting example, the first portion 190a of the skin outer surface 190 and the second portion 190b of the skin outer surface 190 can be distinct skins that can abut or partially overlap at the intersection 198.

A rebate or recess 200 is defined by the second portion 190b of the skin outer surface 190 lying below the airfoil outer surface 142. A recess depth or recess distance 202 is measured between the second portion 142b of the airfoil outer surface 142 and the second portion 190b of the skin outer surface 190. As illustrated, the recess distance 202 can be measured in an axial plane perpendicular to radial direction (Rd) (FIG. 4). The recess distance 202 can be in a range from 0.3 millimeters to 1.0 millimeters. More specifically, the recess distance 202 can be in a range from 0.5 millimeters to 0.7 millimeters.

Additionally, or alternatively, the recess distance 202 can be in a range from 0.001% to 5% of the axial airfoil length 144 (FIG. 4). More specifically, the recess distance 202 can be in a range from 0.01% to 1.5% of the axial airfoil length 144 (FIG. 4).

A boundary region 206 can be defined as a location where the recess distance 202 is changing along the axial direction (Ad). The boundary region 206 has a boundary length 208 measured axially from the intersection 198 to a point 210 along the second portion 190b of the skin outer surface 190. The point 210 can be a location beyond which the recess distance 202 changes less than 5% per centimeter along the axial direction (Ad). As illustrated, by way of example, the boundary length 208 can differ from the suction side 134 to the pressure side 132. Alternatively, the recess distance 202, the boundary region 206, or both the recess distance 202 and the boundary region 206 on the suction side 134 can be within 5% when compared to the recess distance 202 or the boundary region 206 on the pressure side 132.

FIG. 6 is the schematic cross-sectional view of the composite airfoil assembly 110 of FIG. 5 with cladding 120, more specifically the first cladding 150 and the third cladding 154.

The first cladding 150 is coupled to the second portion 190b of the skin outer surface 190. A cladding thickness 212 can be measured from an inner surface 214 to an outer surface 216 of the first cladding 150. A cladding axial length 218 can be measured from the axially forward edge 151c to the axially aft edge 151d.

The inner surface 214 of the first cladding 150 can overlay part of the second portion 190b of the skin outer surface 190. The adhesive 217 can be located on either the inner surface 214, the second portion 190b, or both the second portion 190b and the inner surface 214 to couple the first cladding 150 to the composite airfoil 118. An adhesive thickness 219 can be in a range from 0.01% to 50% of the recess distance 202. It is contemplated that the adhesive thickness 219 can vary in the axial direction (Ad) or the radial direction (Rd) (FIG. 4).

The outer surface 216 of the first cladding 150 can define a part of the second portion 142b of the composite airfoil assembly 110. It is contemplated that the cladding thickness 212 of the first cladding 150 is in a range from 40% to 100% of the recess distance 202. More specifically, the cladding thickness 212 of the first cladding 150 is in a range from 50% to 90% of the recess distance 202. Still more specifically, the cladding thickness 212 of the first cladding 150 is in a range from 60% to 85% of the recess distance 202. This improves aerodynamics of the composite airfoil assembly 110, as the first cladding 150 does not extend or bump out into airflow illustrated by arrow 204.

It is contemplated that a sum of the adhesive thickness 219 and the cladding thickness 212 is within 5% of the recess distance 202. More specifically, the sum of the adhesive thickness 219 and the cladding thickness is within 1% of the recess distance 202. Still more specifically, the sum of the adhesive thickness 219 and the cladding thickness 212 is less than 0.5% different than the recess distance 202.

Alternatively, in a different and non-limiting example, the cladding thickness 212 of the first cladding 150 and the recess distance 202 can be different by more than 10%.

Similar to the first cladding 150, the third cladding 154 has a cladding thickness 220 and a cladding axial length 222. The cladding thickness 220 can be measured from an inner surface 224 to an outer surface 226 of the third cladding 154. The cladding axial length 222 of the third cladding 154 can be measured from an axially forward edge 155a to an axially aft edge 155b.

While illustrated as having similar cladding thickness 212, 220, it is contemplated that the cladding thickness 212 of the first cladding 150 can be different than the cladding thickness 220 of the third cladding 154.

The cladding thickness 212, 220 of the first cladding 150 or the third cladding 154 can be in a range from 0.076 millimeters to 1.016 millimeters. More specifically, the first cladding thickness 212 or the second cladding thickness 220 can be in a range from 0.15 millimeters to 0.51 millimeters.

Additionally, or alternatively, the cladding thickness 212, 220 can be in a range from 0.001% to 5% of the axial airfoil length 144 (FIG. 4). More specifically, the cladding thickness 212, 220 can be in a range from 0.01% to 1.5% of the axial airfoil length 144 (FIG. 4). The range of the cladding thickness 212, 220 improves strength or stiffness while maintaining a weight benefit.

A core thickness 228 can be measured from the pressure side 132 to the suction side 134 across the woven core 182. That is, the core thickness 228 can be measured from the pressure side 132 to the suction side 134 across the woven core 182 in a direction that is perpendicular to the chordwise direction and spanwise direction, where the chordwise direction is defined from the leading edge 124 (FIG. 3) and the trailing edge 126 and the spanwise direction is defined from the root 128 (FIG. 3) to the tip 130 (FIG. 3). The core thickness 228 can be in a range from 2.54 millimeters to 63.5 millimeters. More specifically, the core thickness 228 can be in a range from 3.17 millimeters to 12.7 millimeters.

Additionally, or alternatively, the core thickness 228 can be in a range from 0.05% to 50% of the axial airfoil length 144 (FIG. 4). More specifically, the core thickness 228 can be in a range from 0.2% to 20% of the axial airfoil length 144 (FIG. 4). The range of the core thickness 228 provides a desired aerodynamic profile while maintaining a weight benefit.

The cladding thickness 212, 220 can be in a range from 0.6% to 25% of the core thickness 228. More specifically, the cladding thickness 212, 220 can be in a range from 4% to 16% of the core thickness 228. The range provided for the cladding thickness 212, 220 when compared to the core thickness 228 improves strength or stiffness of the composite airfoil assembly 110 while maintaining a weight benefit.

While illustrated as having a generally uniform cladding thickness 212, 220, the cladding thicknesses 212, 220 can vary in any direction, for example, in the axial direction (Ad), radial direction (Rd), spanwise, or chordwise direction.

The cladding axial length 218, 222 can be in a range from 1% to 10% of the axial airfoil length 144 (FIG. 4). More specifically, the cladding axial length 218, 222 can be in a range from 5% to 10% of the axial airfoil length 144 (FIG. 4). The range provided for the cladding axial length 218, 222 improves strength or stiffness while maintaining a weight benefit.

While illustrated as having different cladding axial lengths 218, 222, it is contemplated that the cladding axial length 218 of the first cladding 150 can be within 5% or less of the cladding axial length 222 of the third cladding 154.

While the first cladding 150 and the third cladding 154 are adjacent the trailing edge 126 of the composite airfoil 118, the axially aft edge 151d of the first cladding 150 and the axially aft edge 155b of the third cladding 154 are illustrated, by way of example, as axially forward of the trailing edge 126. However, it is contemplated that the axially aft edges 151d, 155b can extend past or align with at least a portion of the trailing edge 126.

Optionally, a trailing edge cladding 230 can couple to or be defined by a portion of the first cladding 150 or the third cladding 154. The trailing edge cladding 230 covers at least a portion of the trailing edge 126 of the composite airfoil 118. The trailing edge cladding 230 can include one or more parts or sections.

While illustrated as spaced from the intersection 198, the point 210, or the boundary regions 206 (FIG. 5), the first portion 142a of the airfoil outer surface 142 and the second portion 142b of the airfoil outer surface 142 are considered flush such that the second portion 142b of the airfoil outer surface 142 does not protrude, extend outward, or include a positive bump. That is, the second portion 142b of the airfoil outer surface 142 follows the aerodynamic line or is exactly level with the first portion 142a of the airfoil outer surface 142. Since the first portion 142a and second portion 142b connect, the first portion 142a and second portion 142b can be considered continuous.

It is contemplated, in a different and non-limiting example, that the first cladding 150 or the third cladding 154 can contact the intersection 198 or the point 210, or extend into the boundary regions 206 (FIG. 5). That is, a gap, as illustrated between the intersection 198, the point 210, or the boundary regions 206, and the axially forward edge 151c, 153c (FIG. 4) of the first cladding 150 and the third cladding 154, can be minimized or eliminated by the axially forward edge 151c, 153c extending into the boundary regions 206.

In another different and non-limiting example, one or more of a coating, fill material, or portions of the laminate skin 184 can be geometrically shaped or applied to fill the gap or a portion of the gap between the intersection 198, the point 210, or the boundary regions 206, and the axially forward edge 151c, 153c of the first cladding 150 and the third cladding 154. That is, the first portion 142a and the second portion 142b can touch or be continuous. By way of non-limiting example, a fill material or coating can define a portion of the first portion 142a or the second portion 142b of the airfoil outer surface 142 such that no gap or space exists between the first portion 142a and the second portion 142b.

The non-limiting examples illustrate that the first portion 142a and the second portion 142b as flush and continuous.

Figure 7:
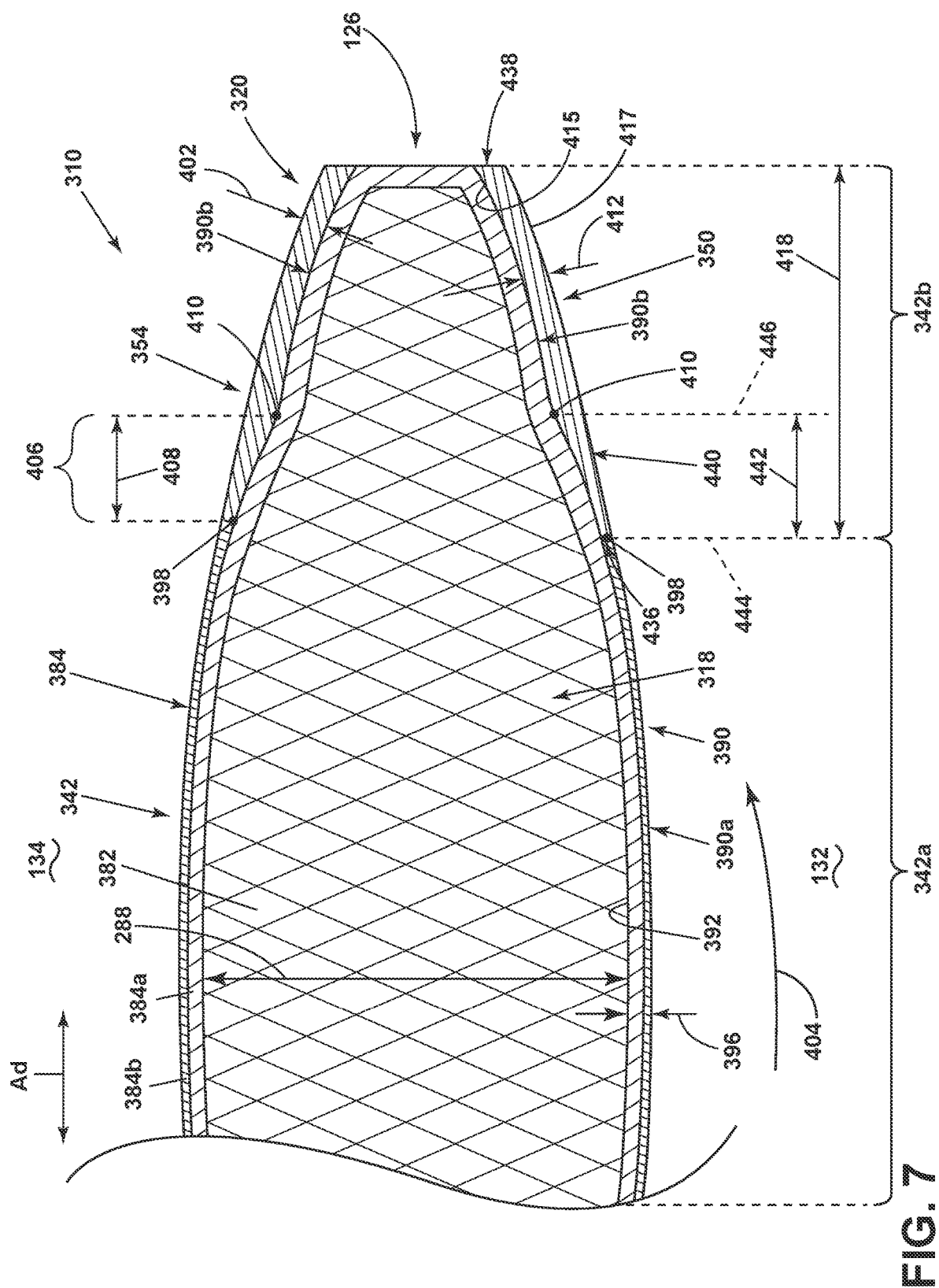
FIG. 7 is a variation of the schematic cross-sectional view of FIG. 6, in accordance with an exemplary embodiment of the present disclosure.

FIG. 7 is a variation of the schematic cross-sectional view of FIG. 6, wherein FIG. 7 illustrates a composite airfoil assembly 310 with a first cladding 350 and the third cladding 354. The composite airfoil assembly 310 is similar to the composite airfoil assembly 110, therefore, like parts will be identified with like numerals increased by two hundred (200), with it being understood that the description of the like parts of the composite airfoil assembly 110 applies to the composite airfoil assembly 310, unless otherwise noted.

A skin 384 can be coupled to the exterior of the woven core 382. The skin 384 can include a first layer 384a and a second layer 384b. The first layer 384a can be a laminate skin. The first layer 384a can be applied before or after curing the woven core 382.

The second layer 384b can be a coating applied directly onto the first layer (laminate skin) 384a. The second layer 384b can be applied before or after the curing of the woven core 382 or the first layer 384a.

However, it is contemplated that an adhesive 217, and more particularly an intermediate adhesive layer (FIG. 6), is provided between the first layer 384a and the second layer 384b. While illustrated as covering a portion of the first layer 384a, the second layer 384b can cover the entirety of the first layer 384a. It is further contemplated that the second layer 384b can be provided on the laminate skin 384 where portions of the laminate skin 384 are uncovered by the cladding 320. It is yet further contemplated that the second layer 384b can be applied to one or more portions of a cladding 320. The second layer 384b can include a second layer bulk modulus that is different or the same as one or more of the core bulk modulus or the first layer bulk modulus. It is contemplated that the second layer bulk modulus is less than the bulk modulus of the cladding 320.

Additionally, the second layer 384b can be an environmental barrier coating, for example, which can be used to resist oxidization or corrosion. In another example, the second layer 384b can be a thermal barrier coating, at least partially thermally insulating the woven core 382 and first layer 384a. Additional non-limiting examples of coatings can include an anti-ice coating such as polyurethane, ice-phobic materials, an ultraviolet radiation coating, or an oil barrier coating such as polyethylene or polypropylene. In one additional non-limiting example, the second layer 384b can be formed as a polypropylene base layer and a polyurethane layer provided on the polypropylene base layer. It is further contemplated that an exterior paint layer (not shown) may be provided on the exterior of the second layer 384b, where such a paint layer may provide radiation protection, such as ultraviolet radiation.

A skin outer surface 390 can be the outer surface of the second layer 384b or the outer surface of the first layer 384a if portions of the first layer 384a are not covered by the second layer 384b. A skin inner surface 392 can be an inner surface of the first layer 384a.

A skin thickness 396 can be measured from the skin outer surface 390 to the skin inner surface 392. The skin thickness 396, as illustrated by way of example, can vary in the axial direction (Ad). It is also contemplated that the skin thickness 396 can vary in one or more of the radial direction (Rd) (FIG. 3), the axial direction (Ad), or the circumferential direction (Cd) (FIG. 3).

A first portion 390a of the skin outer surface 390 defines a first portion 342a of an airfoil outer surface 342 of the composite airfoil assembly 310. A second portion 390b of the skin outer surface 390 lies below a second portion 342b of the airfoil outer surface 342.

An intersection 398 is defined at the location where the first portion 390a of the skin outer surface 390 changes, deflects, or otherwise intersects the second portion 390b of the skin outer surface 390.

A boundary region 406 can be defined as a location where a recess distance 402 is changing along the axial direction (Ad). The recess distance 402 can be measured from the second portion 390b of the skin outer surface 390 to the second portion 342b of the airfoil outer surface 342.

A boundary length 408 of the boundary region 406 is measured axially from the intersection 398 to a point 410 along the second portion 390b of the skin outer surface 390. The point 410 can be a location beyond which the recess distance 402 changes less than 5% per centimeter along the axial direction (Ad).

The boundary length 408 can be in a range from 1% to 300% of the core thickness 228. More specifically, the boundary length 408 can be in a range from 30% to 120% of the core thickness 228.

The boundary length 408 can be in a range from 0.001% to 40% of the axial airfoil length 144 (FIG. 4). More specifically, the boundary length 408 can be in a range from 0.5% to 20% of the axial airfoil length 144.

The first cladding 350 and the third cladding 354 are coupled to the second portion 390b of the skin outer surface 390. A cladding thickness 412 can be measured from an inner surface 415 to an outer surface 417 of the first cladding 350 or the third cladding 354. A cladding length 418 can a cladding axial length measured from a first end or axially forward edge 436 of the first cladding 350 or the third cladding 354 to the respective second end or axially aft edge 438 of the first cladding 350 or the third cladding 354. While illustrated as equal, the cladding length 418 of the first cladding 350 can be different than the cladding length 418 of the third cladding 354. It is further contemplated in a different non-limiting example, that the cladding length can be a radial length measured in the radial direction (Rd) from a radially inward side to a radially outward side of the cladding 320.

The adhesive 217 (FIG. 6) can be located on either the inner surface 415, the second portion 390b, or both the second portion 390b and the inner surface 415 to couple the first cladding 350 or the third cladding 354 to a composite airfoil 318.

The outer surface 417 of the first cladding 350 or the third cladding 354 can define a part of the second portion 342b of the composite airfoil assembly 310. It is contemplated that the cladding thickness 412 of the first cladding 350 or the third cladding 354 is in a range from 40% to 100% of the recess distance 402. More specifically, the cladding thickness 412 of the first cladding 350 or the third cladding 354 is in a range from 50% to 90% of the recess distance 402. Still more specifically, the cladding thickness 412 of the first cladding 350 or the third cladding 354 is in a range from 60% to 85% of the recess distance 402.

The cladding thickness 412 of the first cladding 350 or the third cladding 354 improves aerodynamics of the composite airfoil assembly 310, as the first cladding 350 and/or the third cladding 354 does not extend or bump out into airflow illustrated by arrow 404.

The first cladding 350, the third cladding 354, or the first cladding 350 and the third cladding 354 include a tapered portion 440. As illustrated, by way of example, the tapered portion 440 is defined by changing the cladding thickness 412 in at least the axial direction (Ad). It is contemplated, in a different and non-limiting example that the tapered portion 440 can be defined by changing cladding thickness in at least the radial direction (Rd) (FIG. 4).

The tapered portion 440 can extend into or be located at the boundary region 406. That is, the boundary region 406 receives at least a part of the tapered portion 440 of the cladding 320.

A tapered length 442 of the tapered portion 440 is measured between a first boundary 444 and a second boundary 446 of the tapered portion 440. The tapered length 442 is in a range from 1% to 50% of the cladding length 418. More specifically, the tapered length 442 is in a range from 15% to 30% of the cladding length 418.

As illustrated, by way of example, the tapered length 442 can be within 5% or less of the boundary length 408. More specifically, the tapered length 442 can be within 1% or less of the boundary length 408. It is contemplated that the first portion 342a of the airfoil outer surface 342 and second portion 342b of the airfoil outer surface are flush. That is, the first portion 390a of the skin outer surface 390 abuts with the cladding 320, such that the first portion 342a and the second portion 342b form a continuous airfoil outer surface 342. As used herein, the term "continuous" means without break, void, or gap. In other words, the second portion 390b of the skin outer surface 390 defines a recess having the recess distance 402, where the recess has a complimentary geometry to the cladding 320.

In a different and non-limiting example, a void can exist between the first portion 342a and the second portion 342b, that when filled by one or more materials, forms a continuous airfoil outer surface 342.

Figure 8:
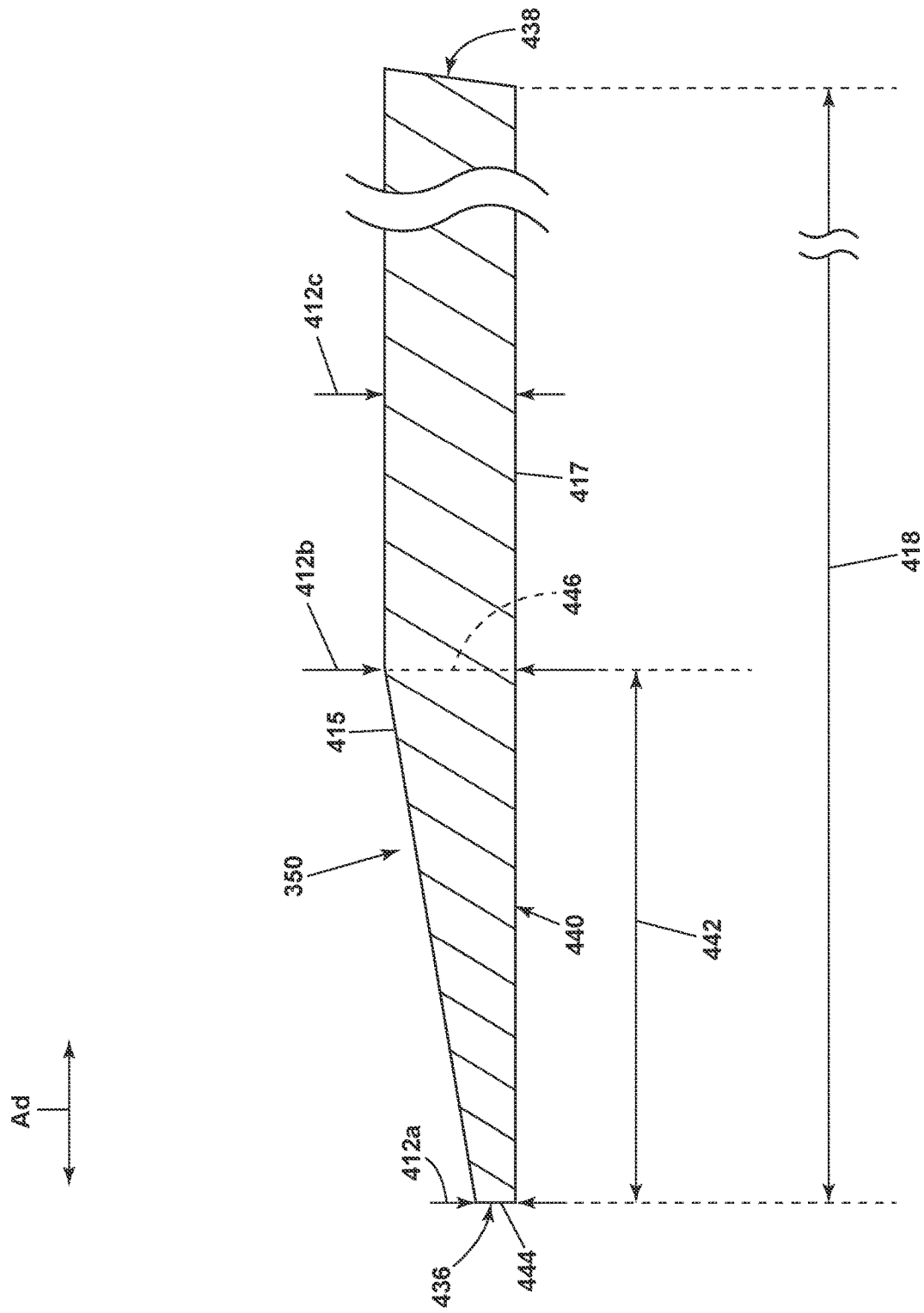
FIG. 8 is an enlarged schematic cross-sectional view of a portion of a first cladding of FIG. 7, in accordance with an exemplary embodiment of the present disclosure.

FIG. 8 is an enlarged schematic cross-sectional view of the first cladding 350 of FIG. 7. The first cladding 350 extends from the axially forward edge 436 to the axially aft edge 438 and includes the tapered portion 440. The tapered portion 440 includes the tapered length 442 measured from the first boundary 444 of the tapered portion 440 to the second boundary 446. By way of non-limiting example, the first boundary 444 is located at the axially forward edge 436.

A first cladding thickness 412a is measured from the inner surface 415 to the outer surface 417 at the first boundary 444. A second cladding thickness 412b is measured from the inner surface 415 to the outer surface 417 at the second boundary 446. A third cladding thickness 412c can be measured from the inner surface 415 to the outer surface 417 between the second boundary 446 and the axially aft edge 438.

The first cladding thickness 412a can be in a range from 0.05% to 4% of the tapered length 442. More specifically, the first cladding thickness 412a can be in a range from 0.1% to 2% of the tapered length 442.

The first cladding thickness 412a can be in a range from 5% to 60% of the second cladding thickness 412b. More specifically, the first cladding thickness 412a can be in a range from 5% to 40% of the second cladding thickness 412b.

The second cladding thickness 412b can be in a range from 0.5% to 10% of the tapered length 442. More specifically, the second cladding thickness 412b can be in a range from 1% to 8% of the tapered length 442.

The third cladding thickness 412c can be within 5% or less of the second cladding thickness 412b. Alternatively, in a different and non-limiting example, the first cladding 350 can include more than one tapered portion where the third cladding thickness 412c is greater than 5% different than the second cladding thickness 412b.

The ranges for the first cladding thickness 412a, the second cladding thickness 412b, and the third cladding thickness 412c provide a weight benefit while strengthening or stiffening the composite airfoil 318 (FIG. 7) with at least the first cladding 350.

While illustrated at the axially forward edge 436 of the first cladding 350 and the third cladding 354, it is contemplated that other portions of the cladding 320 can include a tapered portion. By way of non-limiting example, one or more portions of the axially forward edge 153c of the second cladding 152 (FIG. 4) or the fourth cladding can include a tapered portion.

In operation, the cladding 120, 320 provides improved resistance to torsion, impact, or other forces caused by impact or rotation while maintaining a weight benefit. The recesses 200 provide improved aerodynamics and efficiency, receiving at least some of the cladding 120, 320, which decreases or eliminates positive protrusions or bumps that would impede the airflow, illustrated by arrow 204, along the pressures side 132 or the suction side 134. The tapered portion 440 transmits load at the bonded interface or boundary region 206, 406.

The tapered portion 440 prevents or reduces large load discontinuity that could happen with an abrupt change due to impact or rotation. That is, the smooth angled transition of the cladding between the first boundary 444 to the second boundary 446 helps to distribute force and prevent or reduce force from being localized at a small surface area which reduces material stress at the boundary region 206, 406.

Benefits of aspects of the invention include, recesses in the composite airfoil, such that when the cladding is received by the recesses, the aerodynamics are improved. Aerodynamics can be improved by removing positive bumps resulting from a cladding coupled to a composite airfoil without recesses. Further, the composite airfoil with recesses and cladding as stiffeners provides a weight benefit and a strengthening benefit.

The tapered portions of the cladding improve load transmission at the bonded interface. The taper avoids the large load discontinuity that could happen with an abrupt change due to impact or rotation.

There are weight benefits to using a composite airfoil having a cladding with a greater bulk modulus than the woven core and the laminate skin. The cladding, when added to the composite airfoil, can provide improved resistance to torsion, impact, or other forces caused by impact or rotation while maintaining a weight benefit.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A composite airfoil assembly for a turbine engine, the composite airfoil assembly having an airfoil outer surface defining opposing pressure and suction sides, which extend between a leading edge and a trailing edge, the composite airfoil assembly comprising a woven core comprising a composite structure defining a core exterior, a skin applied to at least a portion of the core exterior, the skin having a skin outer surface, with a first portion of the skin outer surface defining a first portion of the airfoil outer surface, and a second portion of the skin outer surface lying below the airfoil outer surface to define a recess, and a cladding located adjacent the trailing edge, the leading edge, a root, or a tip, the cladding having at least a portion located within the recess, and having a cladding outer surface that defines a second portion of the airfoil outer surface, wherein the first portion of the airfoil outer surface and second portion of the airfoil outer surface are flush.

A composite airfoil assembly, for a gas turbine engine, the composite airfoil assembly having an airfoil outer surface defining opposing pressure and suction sides, which extend between leading and trailing edges in an axial direction, and from a root to a tip in a radial direction, the composite airfoil assembly comprising a composite airfoil comprising a woven core comprising a composite structure defining a core exterior, and a skin applied to at least a portion of the core exterior and having a skin outer surface, and a cladding coupled to the skin outer surface where at least one edge or portion of the cladding is located adjacent at least one of the trailing edge, the root, or the tip, the cladding having a tapered portion at the pressure side or the suction side.

The composite airfoil assembly of any preceding clause, further comprising a recess distance measured between the second portion of the airfoil outer surface and the second portion of the skin outer surface, wherein the recess distance is in a range from 0.001% to 5% of an axial airfoil length measured from the leading edge to the trailing edge.

The composite airfoil assembly of any preceding clause, wherein the cladding includes a cladding thickness measured from the cladding outer surface to a cladding inner surface.

The composite airfoil assembly of any preceding clause, wherein the cladding thickness is in a range from 40% to 100% of the recess distance.

The composite airfoil assembly of any preceding clause, further comprising adhesive located between the cladding inner surface and the second portion of the skin outer surface, wherein the adhesive couples the cladding to the second portion of the skin outer surface.

The composite airfoil assembly of any preceding clause, wherein the adhesive includes an adhesive thickness in a range from 0.01% to 50% of the recess distance.

The composite airfoil assembly of any preceding clause, wherein a sum of the adhesive thickness and the cladding thickness is within 5% of the recess distance.

The composite airfoil assembly of any preceding clause, wherein a sum of the adhesive thickness and the cladding thickness is within 1% of the recess distance.

The composite airfoil assembly of any preceding clause, further comprising a recess distance measured between the second portion of the airfoil outer surface and second portion of the skin outer surface, wherein the recess distance is in a range from 0.01% to 1.5% of an axial airfoil length measured from the leading edge to the trailing edge.

The composite airfoil assembly of any preceding clause, wherein the first portion of the skin outer surface and the second portion of the skin outer surface intersect to form a boundary region having a changing recess distance measured between the second portion of the airfoil outer surface and the second portion of the skin outer surface.

The composite airfoil assembly of any preceding clause, wherein the boundary region has a boundary length in a range from 0.001% to 40% of an axial airfoil length measured from the leading edge to the trailing edge.

The composite airfoil assembly of any preceding clause, wherein the boundary region has a boundary length in a range from 0.5% to 20% of an axial airfoil length measured from the leading edge to the trailing edge.

The composite airfoil assembly of any preceding clause, wherein the woven core includes a core thickness measured from the pressure side to the suction side across the woven core in a direction perpendicular to a chordwise direction and a spanwise direction and wherein the core thickness is in a range from 0.05% to 50% of an axial airfoil length measured from the leading edge to the trailing edge.

The composite airfoil assembly of any preceding clause, wherein the cladding includes a cladding thickness, wherein the cladding thickness is in a range from 0.6% to 25% of the core thickness.

The composite airfoil assembly of any preceding clause, wherein the boundary region has a boundary length in a range from 1% to 300% of the core thickness.

The composite airfoil assembly of any preceding clause, wherein the recess includes a complimentary geometry to the cladding.

The composite airfoil assembly of any preceding clause, wherein the woven core includes a three-dimensional weave pattern.

The composite airfoil assembly of any preceding clause, wherein the cladding includes a cladding thickness measured from a cladding inner surface to a cladding outer surface, wherein the tapered portion is defined by changing the cladding thickness in at least one of the axial direction or the radial direction.

The composite airfoil assembly any preceding clause, wherein the cladding includes a cladding length measured from a first end to a second end of the cladding, and the tapered portion extends from a first boundary to a second boundary defining a tapered length, wherein the tapered length is in a range from 1% to 50% of the cladding length.

The composite airfoil assembly of any preceding clause, wherein the first boundary is at the first end and the tapered length is in a range from 15% to 30% of the cladding length.

The composite airfoil assembly of any preceding clause, wherein the tapered portion extends from a first boundary to a second boundary defining a tapered length, wherein the cladding thickness at the first boundary is in a range from 0.05% to 2% of the tapered length.

The composite airfoil assembly of any preceding clause, wherein the tapered portion extends from a first boundary to a second boundary defining a tapered length, wherein the cladding thickness at the second boundary is in a range from 0.5% to 10% of the tapered length.

The composite airfoil assembly of any preceding clause, wherein the tapered portion extends from a first boundary to a second boundary, wherein the cladding thickness at the first boundary is in a range from 5% to 60% of the cladding thickness at the second boundary.

The composite airfoil assembly of any preceding clause, the skin having a first portion of the skin outer surface defining a first portion of the airfoil outer surface, and a second portion of the skin outer surface lying below the airfoil outer surface to define a recess.

The composite airfoil assembly of any preceding clause, the cladding having at least a portion located within the recess and having a cladding outer surface that defines a second portion of the airfoil outer surface, wherein the first portion of the airfoil outer surface and second portion of the airfoil outer surface are flush.

The composite airfoil assembly of any preceding clause, wherein the recess includes a complimentary geometry to the cladding.

The composite airfoil assembly of any preceding clause, wherein the first portion of the skin outer surface and the second portion of the skin outer surface intersect to form a boundary region wherein the boundary region receives the tapered portion of the cladding.

The composite airfoil assembly of any preceding clause, wherein the three-dimensional weave pattern includes a braided pattern.

The composite airfoil assembly of any preceding clause, wherein the skin is a laminate skin.

The composite airfoil assembly of any preceding clause, wherein the woven core is made from a different material than the skin.

The composite airfoil assembly of any preceding clause, wherein the tapered portion is axially located between the leading edge and the trailing edge.

The composite airfoil assembly of any preceding clause, wherein the tapered portion is located at an axially inner edge.

The composite airfoil assembly of any preceding clause, wherein the boundary length is in a range from 30% to 120% of the core thickness.

The composite airfoil assembly of any preceding clause, wherein the cladding includes a first cladding and a second cladding, wherein the first cladding is located at the trailing edge and the second cladding is located at the tip.

The composite airfoil assembly of any preceding clause, wherein the cladding further comprises a third cladding located at the trailing edge opposite the first cladding.

The composite airfoil assembly of any preceding clause, wherein the cladding further comprises a fourth cladding located at the tip opposite the second cladding.

The composite airfoil assembly of any preceding clause, wherein the boundary length of the boundary region is measured axially from an intersection to a point along the second portion of the skin outer surface, wherein the point is an axial location beyond which the recess distance changes less than 5% per centimeter along the axial direction.

A turbine engine comprising a fan section, a compressor section, a combustor section, and a turbine section in serial flow arrangement, and defining an engine centerline, and a composite airfoil assembly having an airfoil outer surface defining opposing pressure and suction sides, which extend between a leading edge and a trailing edge to define a chord-wise direction and from a root to a tip to define a span-wise direction, the composite airfoil assembly comprising a core comprising a composite structure defining a core exterior, a skin applied to at least a portion of the core exterior, the skin having a skin outer surface, with a first portion of the skin outer surface defining a first portion of the airfoil outer surface, and a second portion of the skin outer surface lying below the airfoil outer surface to define a recess, and a cladding located adjacent the trailing edge, the leading edge, the root, or the tip, the cladding having at least a portion located within the recess and having a cladding outer surface that defines a second portion of the airfoil outer surface, wherein the first portion of the airfoil outer surface and second portion of the airfoil outer surface are flush.

A turbine engine comprising a fan section, a compressor section, a combustor section, and a turbine section in serial flow arrangement, and defining an engine centerline, and a composite airfoil assembly, for a gas turbine engine, the composite airfoil assembly having an airfoil outer surface defining opposing pressure and suction sides, which extend between leading and trailing edges to define a chord-wise direction, and from a root to a tip to define a span-wise direction, the composite airfoil assembly comprising a core comprising a composite structure defining a core exterior, a skin applied to at least a portion of the core exterior, and a cladding located adjacent the trailing edge, the root, or the tip, the cladding having a tapered portion.

The turbine engine of any preceding clause, further comprising a recess distance measured between the second portion of the airfoil outer surface and second portion of the skin outer surface, wherein the recess distance is in a range from 0.001% to 5% of an axial airfoil length measured from the leading edge to the trailing edge.

The turbine engine of any preceding clause, further comprising a recess distance measured between the second portion of the airfoil outer surface and second portion of the skin outer surface, wherein the recess distance is in a range from 0.01% to 1.5% of an axial airfoil length measured from the leading edge to the trailing edge.

The turbine engine of any preceding clause, further comprising adhesive located between a cladding inner surface and the second portion of the skin outer surface, wherein the adhesive couples the cladding to the second portion of the skin outer surface.

The turbine engine of any preceding clause, wherein the adhesive includes an adhesive thickness and the cladding includes a cladding thickness measured from the cladding outer surface to the cladding inner surface, wherein a sum of the adhesive thickness and the cladding thickness is within 5% of the recess distance.

The turbine engine of any preceding clause, wherein the cladding includes a cladding thickness measured from a cladding inner surface to a cladding outer surface, wherein the tapered portion is defined by changing cladding thickness in at least one of an axial direction or a radial direction.

The turbine engine of any preceding clause, wherein the cladding includes a cladding length measured from a first end to a second end of the cladding, and the tapered portion extends from a first boundary to a second boundary defining a tapered length, wherein the tapered length is in a range from 1% to 50% of the cladding length.

The turbine engine of any preceding clause, wherein the first boundary is at the first end and the tapered length is in a range from 15% to 30% of the cladding length.

The gas turbine engine of any preceding clause, wherein the tapered portion extends from a first boundary to a second boundary defining a tapered length, wherein the cladding thickness at the first boundary is in a range from 0.05% to 2% of the tapered length.

What is claimed is:

1. A composite airfoil assembly, for a turbine engine, the composite airfoil assembly having an airfoil outer surface defining opposing pressure and suction sides, which extend between leading and trailing edges in an axial direction, and from a root to a tip in a radial direction, the composite airfoil assembly comprising:
    a composite airfoil comprising:
        a woven core comprising a composite structure defining a core exterior; and
        a skin applied to at least a portion of the core exterior and having a skin outer surface; and
        a cladding coupled to the skin outer surface where at least one edge or portion of the cladding is located adjacent at least one of the trailing edge, the root, or the tip, the cladding having a tapered portion at the pressure side or the suction side.

2. The composite airfoil assembly of claim 1, wherein the cladding includes a cladding thickness measured from a cladding inner surface to a cladding outer surface, wherein the tapered portion is defined by changing the cladding thickness in at least one of the axial direction or the radial direction.

3. The composite airfoil assembly of claim 2, wherein the cladding includes a cladding length measured from a first end to a second end of the cladding, and the tapered portion extends from a first boundary to a second boundary defining a tapered length, wherein the tapered length is in a range from 1% to 50% of the cladding length.

4. The composite airfoil assembly of claim 3, wherein the first boundary is at the first end and the tapered length is in a range from 15% to 30% of the cladding length.

5. The composite airfoil assembly of claim 2, wherein the tapered portion extends from a first boundary to a second boundary defining a tapered length, wherein the cladding thickness at the first boundary is in a range from 0.05% to 2% of the tapered length.

6. The composite airfoil assembly of claim 2, wherein the tapered portion extends from a first boundary to a second boundary defining a tapered length, wherein the cladding thickness at the second boundary is in a range from 0.5% to 10% of the tapered length.

7. The composite airfoil assembly of claim 2, wherein the tapered portion extends from a first boundary to a second boundary, wherein the cladding thickness at the first boundary is in a range from 5% to 60% of the cladding thickness at the second boundary.

8. The composite airfoil assembly of claim 1, the skin having a first portion of the skin outer surface defining a first portion of the airfoil outer surface, and a second portion of the skin outer surface lying below the airfoil outer surface to define a recess.

9. The composite airfoil assembly of claim 8, the cladding having at least a portion located within the recess and having a cladding outer surface that defines a second portion of the airfoil outer surface, wherein the first portion of the airfoil outer surface and the second portion of the airfoil outer surface are flush.

10. The composite airfoil assembly of claim 8, wherein the recess includes a complimentary geometry to the cladding.

11. The composite airfoil assembly of claim 8, wherein the first portion of the skin outer surface and the second portion of the skin outer surface intersect to form a boundary region wherein the boundary region receives the tapered portion of the cladding.

12. The composite airfoil assembly of claim 1, wherein the woven core includes a three-dimensional weave pattern.

13. The composite airfoil assembly of claim 12, wherein the three-dimensional weave pattern includes a braided pattern.

14. The composite airfoil assembly of claim 12, wherein the skin is a laminate skin.

15. The composite airfoil assembly of claim 12, wherein the woven core is made from a different material than the skin.

16. A turbine engine comprising:
    a fan section, a compressor section, a combustor section, and a turbine section in serial flow arrangement, and defining an engine centerline; and
    a composite airfoil assembly, for a gas turbine engine, the composite airfoil assembly having an airfoil outer surface defining opposing pressure and suction sides, which extend between leading and trailing edges to define a chord-wise direction, and from a root to a tip to define a span-wise direction, the composite airfoil assembly comprising:
        a core comprising a composite structure defining a core exterior;
        a skin applied to at least a portion of the core exterior; and
        a cladding located adjacent the trailing edge, the root, or the tip, the cladding having a tapered portion.

17. The turbine engine of claim 16, wherein the cladding includes a cladding thickness measured from a cladding inner surface to a cladding outer surface, wherein the tapered portion is defined by changing cladding thickness in at least one of an axial direction or a radial direction.

18. The turbine engine of claim 17, wherein the cladding includes a cladding length measured from a first end to a second end of the cladding, and the tapered portion extends from a first boundary to a second boundary defining a tapered length, wherein the tapered length is in a range from 1% to 50% of the cladding length.

19. The turbine engine of claim 18, wherein the first boundary is at the first end and the tapered length is in a range from 15% to 30% of the cladding length.

20. The gas turbine engine of claim 17, wherein the tapered portion extends from a first boundary to a second boundary defining a tapered length, wherein the cladding thickness at the first boundary is in a range from 0.05% to 2% of the tapered length.

* * * * *